L. PORTER & C. H. WILLIAMS, Jr.
ADJUSTABLE BRAKE HEAD.
APPLICATION FILED JAN. 12, 1910.
959,600.
Patented May 31, 1910.
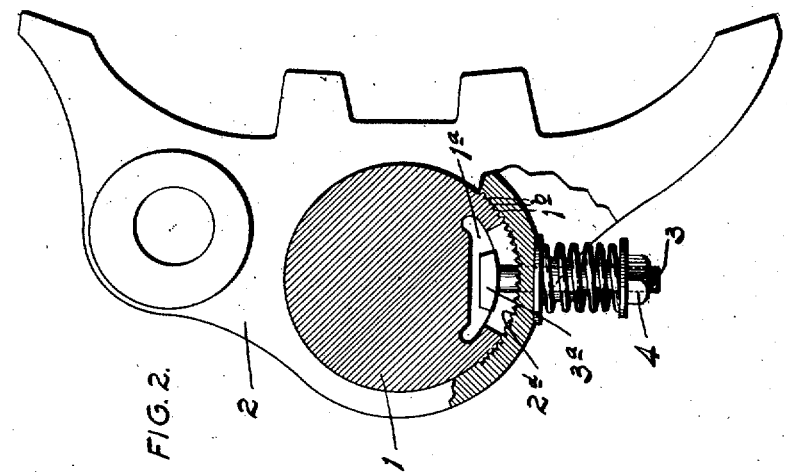
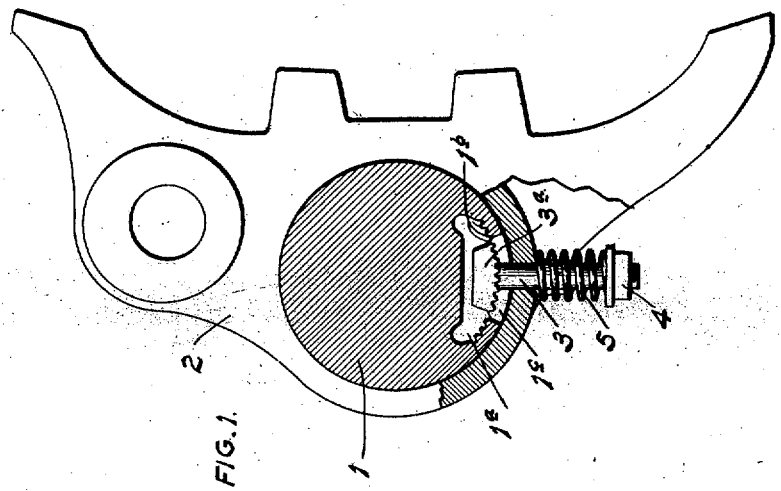
INVENTORS
LEMUEL PORTER
CHARLES H. WILLIAMS JR
BY
ATT'Y.

UNITED STATES PATENT OFFICE.

LEMUEL PORTER AND CHARLES H. WILLIAMS, JR., OF CHICAGO, ILLINOIS, ASSIGNORS TO CHICAGO RAILWAY EQUIPMENT COMPANY, OF CHICAGO, ILLINOIS, A CORPORATION OF ILLINOIS.

ADJUSTABLE BRAKE-HEAD.

959,600.  Specification of Letters Patent.  Patented May 31, 1910.

Application filed January 12, 1910. Serial No. 537,747.

*To all whom it may concern:*

Be it known that we, LEMUEL PORTER and CHARLES H. WILLIAMS, Jr., citizens of the United States, residing at Chicago, Illinois, have invented a certain new and useful Improvement in Adjustable Brake-Heads, of which the following is a full, clear, and exact description, such as will enable others skilled in the art to which it appertains to make and use the same, reference being had to the accompanying drawings, forming part of this specification, in which—

Figure 1 is an elevational view, partly in section, of my improved adjustable brake head. Fig. 2 is a similar view of a modified form of a brake head.

This invention relates to a new and useful improvement in adjustable brake heads, the object being to construct a head which will be held in the position to which it is adjusted upon application of the brakes.

In our present invention we have shown a locking-block which is carried by the brake head and which coöperates with the part on which the brake head is mounted, said block being pressed outwardly by a spring arranged outside of the brake head and coöperating with a serrated face within the part of the brake beam on which the brake head is mounted.

In the drawings 1 indicates the thrust block or sleeve being a part of the brake beam on which the brake head 2 is mounted. This sleeve is provided with a recess 1$^a$ for receiving the locking-block 3$^a$, the face of said recess being preferably corrugated or serrated as at 1$^b$, but it is obvious that these serrations may be omitted if desired and the head held in position by the friction of co-operating plain faces.

1$^c$ is a slot in the part of the brake beam on which the head is mounted, said slot being circumferentially disposed and through which extends a bolt or shank 3 carrying a locking-block 3$^a$ at its inner end. This bolt passes freely through an opening in the brake head and is provided with a nut or shoulder 4 at its outer end, between which and the brake head is a coil spring 5. This spring presses the locking-block outwardly and clamps a part of the brake beam therebetween and the wall of the socket of the brake head. Tension on the locking-block may be adjusted by screwing of the nut 4.

In Fig. 2 we have shown a modified form in which the locking-block is provided with a plain face and the part of the brake beam on which it is mounted is provided with a corrugated face 1$^b$, said corrugated face coöperating with a corresponding face 2$^d$ on the brake head. The part of the brake beam which is clamped between the locking-block and the brake head, holds the brake head in its adjusted position.

We claim:

1. The combination of an adjustable brake head, a part of the brake beam on which the same is mounted, and means carried by the brake head and exerting outward pressure on the part of the brake beam to clamp the same against the brake head to hold said head in adjusted position.

2. The combination of a brake head, a part of the brake beam on which the same is mounted, said brake beam part being recessed, a locking-block arranged in said recess and means for exerting yielding pressure against said locking-block to force the same outwardly whereby a part of the brake beam on which the head is mounted is clamped between said locking block and said head.

3. The combination of a brake head, a part of the brake beam on which the same is mounted, said part having a recess and a circumferential slot, a locking-block operating in said recess and having a stem or bolt extending outwardly through said slot and through the brake head, and a spring coöperating with the outer end of said stem or bolt.

4. The combination of a brake head, a part of the brake beam on which the same is mounted, said part having a recess and a circumferential slot, a locking-block operating in said recess and having a stem or bolt extending outwardly through said slot and through the brake head, and a spring arranged upon the outer end of said stem or bolt and means for regulating the compression of said spring.

In testimony whereof we hereunto affix our signatures in the presence of two witnesses, this 8th day of January, 1910.

LEMUEL PORTER.
    CHARLES H. WILLIAMS, JR.

Witnesses:
    EDWARD T. WALKER,
    J. W. WEINLANDS.